United States Patent
Christou

(10) Patent No.: US 7,045,203 B2
(45) Date of Patent: May 16, 2006

(54) FIBROUS REINFORCEMENT SUITABLE AS A FIREPROOFING AGENT

(75) Inventor: Philippe D. Christou, St-Clair de la Tour (FR)

(73) Assignee: HEXCEL Reinforcements, Villeurbanne (FR)

( * ) Notice: Subject to any disclaimer, the term of this patent is extended or adjusted under 35 U.S.C. 154(b) by 0 days.

(21) Appl. No.: 10/785,261

(22) Filed: Feb. 23, 2004

(65) Prior Publication Data

US 2004/0197539 A1 Oct. 7, 2004

(30) Foreign Application Priority Data

Feb. 26, 2003 (FR) .................................. 03 02327

(51) Int. Cl.
*B32B 27/04* (2006.01)
(52) U.S. Cl. .................. 428/297.4; 428/105; 428/113; 428/137; 428/206; 427/372.2; 427/375; 427/379; 264/332
(58) Field of Classification Search ................ 428/105, 428/113, 137, 172, 195.1, 206, 297.4; 427/213.31, 427/337, 372.2, 375, 419.1, 379, 380, 404; 264/332
See application file for complete search history.

(56) References Cited

U.S. PATENT DOCUMENTS 6,248,160 B1   6/2001   Nozaki et al.

FOREIGN PATENT DOCUMENTS

| DE | 509 367 |   | 8/1971 |
|----|---------|---|--------|
| EP | 0 093 903 A2 |   | 4/1983 |
| EP | 0 753 537 A1 |   | 1/1997 |
| FR | 1.550.828 |   | 1/1968 |
| GB | 1346246 | * | 2/1974 |
| GB | 2 250 291 A |   | 11/1991 |

* cited by examiner

*Primary Examiner*—Merrick Dixon
(74) *Attorney, Agent, or Firm*—W. Mark Bielawski; David J. Oldenkamp

(57) ABSTRACT

A fibrous reinforcement including a fibrous support treated throughout or covered at least partially on one of its surfaces with a compound containing: i) one or more thermosetting prepolymers having a softening temperature of 150° C. or lower and/or one or more thermoplastic polymers having a glass transition temperature lower than 300° C.; and ii) one or more inorganic phosphorus compounds. The treatment ratio of the fibrous support with the inorganic phosphorus compound(s) falls within the range of 2%–20% by weight. The fibrous reinforcement is suitable for use as a fireproofing agent.

17 Claims, No Drawings

FIBROUS REINFORCEMENT SUITABLE AS A FIREPROOFING AGENT

BACKGROUND OF THE INVENTION

1. Field of the Invention

The present invention concerns fibrous reinforcements that are suitable for use as fireproofing agents. The invention is especially applicable in the area of composite items used in the automobile, aeronautical or naval industries.

2. Description of Related Art

Composite items are typically composed of a fibrous component and a resin or matrix component. Such composite items may be fabricated using a process called "direct" or a process called "indirect." A direct process is defined by the fact that one or more fibrous reinforcements are used in the "dry" state. In the dry state, fibrous reinforcements do not include the final matrix. The resin or matrix, which is thermoplastic, thermosetting, or a combination of the two types, is brought in separately. For example, the resin may be brought in by injecting it into a mold containing the reinforcing fibers. This process is known as the resin transfer molding (RTM) process. Another process for bringing in the resin involves infusion into a mold and throughout the thickness of the fibrous reinforcements. This process is known as the liquid resin infusion (LRI) process or the resin film infusion (RFI) process. Other processes include manual coating/impregnation with a roller or brush on each of the single layers of the fibrous reinforcement which are applied successively on the form. An indirect process is defined by the fact that the fibers and the resin are first associated before they are used.

For the RTM, LRI or RFI processes, generally a fibrous preform in the shape of the desired finished article must first be fabricated then impregnated with a thermoplastic or thermosetting resin. The resin is injected or infused by suction and then thermoset to harden it after polymerization.

Composite items used in the automobile, aeronautical or naval industries especially are subject to very strict requirements as to non-flammability. There are different ways to make a composite material flame-resistant. The solutions are relatively well known to a person skilled in the art with regard to composite materials obtained by an indirect process.

In high-performance applications of composite materials, fibrous materials impregnated with a resin, usually called "preimpregnates" or "prepregs," are the most used intermediate materials. For example, U.S. Pat. No. 5,714,419 describes a prepreg comprising a modified thermosetting resin containing a flame retardant, and a substrate of carbon paper impregnated with the resin, the substrate containing carbon fibers in polyacrylonitrile and an alcohol binder. The flame retardant may be a halogenated compound, an antimony compound, or an organic phosphate.

In the case of prepregs, the resin that is impregnated in the fibrous reinforcement may later be modified by fireproofing agents of all types, especially those that would not be solubilized or that would significantly increase the viscosity of the resin.

For resins to be used in direct processes (RTM, RFI, LRI and the like.), it is not possible to use solid modifiers dispersed in said resin because the modifiers would be retained (filtered) by the fibrous reinforcement and the result would be a composite material that is not homogeneous in composition. It is also not possible to use modifiers that might increase the viscosity of the injected or infused resin without too great and too negative a modification of the fabrication process parameters. Thus, these imperatives must be taken into account when formulating resins for direct processes. This usually leads to modified resins that have defects of performance, defects of use or defects of composition in the light of regulations that do not authorize halogenated fireproofing agents, for example. That is why it has sometimes been proposed to modify the composite material with a later treatment.

For example, U.S. Pat. No. 5,389,435 proposes a composite material based on carbon fibers and epoxy resin on the surface of which is laid a fiberglass canvas coated with a compound that includes a silicate-type inorganic load and an epoxy resin that may be identical to the resin in the composite material. Such a solution is costly because the ultimate property of fire resistance is not obtained directly. Furthermore it is not satisfactory because the item is made heavier by layering while there is no gain in mechanical performance.

It must also be emphasized that to obtain the materials described in the two patents mentioned above, it is necessary to use methyl ethyl ketone-type solvents that are toxic to health and the environment.

SUMMARY OF THE INVENTION

One problem the present invention proposes to resolve is providing a fibrous reinforcement that allows obtaining, by a direct process, fireproof composite materials that perform as well as composite materials obtained from prepregs.

Another problem the present invention proposes to resolve is providing an easily produced fibrous reinforcement that does not require the use of organic solvents that are toxic to health and to the environment.

Another problem the present invention proposes to resolve is providing a fibrous reinforcement that enables composite fireproof materials free of halogens to be obtained by a direct process.

Another problem the invention proposes to resolve is providing a fibrous reinforcement that enables fireproof composite materials with mechanical properties identical to the properties of non-fireproof materials to be obtained by direct process.

Now it has been discovered, and this is the basis of the invention, that by treating a fibrous support with at least one thermosetting resin and/or a thermoplastic resin and at least one inorganic phosphorus compound, a fibrous reinforcement can be obtained that enables fireproof composite materials to be fabricated, which keep their mechanical properties.

The above discussed and many other features and attendant advantages of the present invention will become better understood by reference to the detailed description.

DETAILED DESCRIPTION OF THE INVENTION

Thus, according to a first embodiment, the invention concerns a fibrous reinforcement, specifically for making composite items, including a fibrous support that is treated throughout, or preferably covered at least partially on one of its surfaces with a composition containing the following:

i) One or more thermosetting prepolymers with a softening temperature of 150° C. or less, preferably in the range of 50°–100° C. and/or one or more thermoplastic polymers with a glass transition temperature under 300° C., preferably in the range of 50°–200° C.; and ii) One or more inorganic phosphorus compounds.

The rate of treatment for the fibrous support with the inorganic phosphorous compound(s) runs in the range of 2%–20% by weight, preferably in the range of 4%–12% by weight, even more preferably again in the range of 6%–10% by weight.

The fibrous reinforcement according to the invention comprises a fibrous support. The fibrous support is made of reinforcing fibers such as fiberglass, carbon, ceramic, possibly as a mixture. Such a support may take the form of a fabric or even a non-woven fabric, and the fibers may be oriented mono-, bi- or pluri-directionally. Preferably the fibrous support has a surface mass in the range of 80–4000 g/m$^2$, preferably in the range of 100–2500 g/m$^2$, and even more preferably in the range of 150–400 g/m$^2$.

The fibrous support is treated with a compound including one or more thermosetting prepolymers and/or one or more thermoplastic polymers and one or more inorganic phosphorus compounds. The compound may be applied so as to obtain a treatment throughout or preferably to cover at least partially at least one of the surfaces of the fibrous support, for example, one of the large surfaces of the support or even both surfaces. Said compound preferably contains:

about 20%–60% by weight of the resin component (thermosetting prepolymer(s) and/or thermoplastic polymer(s)); and about 80%–40% by weight of inorganic phosphorous compound(s).

The term "about" is intended to mean that the actual amount of resin component or inorganic phosphorous compound may be up to 5 weight percent outside the above-stated ranges and still be considered to be within the range.

The thermosetting prepolymer(s) is (are) selected to be compatible with the resin matrix used later at the time of fabricating the composite items. Different thermosetting prepolymers may be used, for example, those traditionally used in molding operations. Preferably, but not limited to, the following may be used: bismaleimide (BMI) resins, cyanate resins, epoxy resins and mixtures thereof, or a hydride system of resins combining, for example, cyanate ester and bismaleimide comonomers, ester cyanate and epoxy comonomers, and epoxy and bismaleimide comonomers, possibly associated with a hardener and/or a catalyst or a mixture of hardeners and/or adapted catalysts. Among these resins, epoxy resins are particularly preferred. The hardening agents or catalysts may be present in the form of a discrete pulverulent or in close combination with the thermosetting prepolymer(s).

The bismaleimide resins are thermopolymerizable resins whose reactive function groups are of the maleimide type. According to the invention, by bismaleimides is meant mono-. bis-, tris-, tetrakis-maleimides, or maleimides of higher functionality, alone or in a mixture, with the bismaleimides preferred. The bismaleimide resins are generally obtained by a reaction of maleic anhydride or a reaction of a substituted maleic anhydride such as methyl maleic anhydride, with an aromatic or aliphatic di- or polyamine. In this regard, refer to U.S. Pat. Nos. 3,018,290, 3,018,292, 3,627, 780, 3,770,691 and 3,839,358.

The corresponding nadicimide resins may also be used, similarly prepared by causing a reaction of a di- or polyamine, not with maleic anhydride but with the product resulting from a Diels-Alder reaction caused between the maleic anhydride or a substituted maleic anhydride and a diene such as cyclopentadiene. Also, in the meaning of the invention, the term bismaleimide may include nadicimide-type prepolymers.

The di- or polyamides used are preferably aliphatic or aromatic diamines. The aliphatic diamines may be linear, branched, cyclical or even contain heteroatoms. The aliphatic diamines particularly preferred are hexane diamine, octane diamine, decane diamine, dodecane diamine and trimethyl hexane diamine.

The aromatic diamines may contain one or more aromatic rings and may also contain fused bonds. The preferred aromatic diamines are phenylene diamines, toluene diamines, the different methylene dianilines, and particularly, 4,4'-methylene dianiline; naphthalene diamines; the different polyarylene oligomers having a terminal amino group and corresponding to the formula:

$H_2N$—Ar[X—Ar]$_n$NH$_2$, in which each Ar independently represents a mono- or poly-ring arylene radical, each X independently represents —O—, —S—, —CO$_2$—, —SO$_2$—, —O—CO—, ($C_1$–$C_{10}$)alkyl, halogenated ($C_1$–$C_{10}$)alkyl, ($C_2$–$C_{10}$)alkoxy, aryloxy, polyoxyalkylene or polyoxyarylene, and n represents an integer from 1–10; and the di- and polysiloxanes that have a terminal primary amino alkyl.

Preferably, a eutectic mixture of bismaleimide resins may be used, for the mixture generally has a melting point that is well below the individual bismaleimides in the mixture. Such eutectic mixtures are commercially available, but refer also to U.S. Pat. Nos. 4,413,107 and 4,377,657.

The cyanate resins are thermopolymerizable with their reactivity being derived from the presence of cyanate groups, or —OCN. These resins are generally obtained from the reaction of a di- or polyfunctional phenol compound with a cyanogen halide such as ClCN or BrCN. These types of reactions are well known to a person skilled in the art. The products resulting from this reaction are phenol ester di- or polycyanates.

The cyanate ester prepolymers may be prepared by heating monomers to cyanate functionality with or without a catalyst. The degree of polymerization may be monitored by measuring the viscosity. Catalysts may be used to enhance polymerization. Such prepolymers and catalysts are well known to a person skilled in the art.

Numerous cyanate resins are commercially available or may be prepared from mono-, di- or polyphenols, including fused aromatic compounds. The phenols may be substituted by a great variety of organic substitutes such as, for example, a halogen atom, a nitro, phenoxy, acyloxy, acyl, cyan, alkyl, aryl, alkaryl, cycloalkyl group. The alkyl groups may be halogenated, with substitutes of the methyl or trifluoromethyl type particularly preferred. The preferred phenol groups are the mononuclear diphenols such as hydroquinone and resorcinol, the different bisphenols, such as bisphenol A, bisphenol F, or bisphenol S and the different dihydroxynaphthalenes and the phenol and cresol oligomers derived from novolac.

Phenols may also be used, such as phenol oligomers substituted by a dicyclopentadiene obtained from the Friedel and Crafts addition of dicyclopentadiene on a phenol, possibly substituted, as described particularly in U.S. Pat. No. 3,536,734.

Epoxy resins may also be used alone or as comonomers in the cyanate or bismaleimide resin systems mentioned. The epoxy resins are thermosetting resins containing an oxyrane group, or epoxy as a functional group. The oxirane group may be obtained using different procedures, for example, by the reaction of an unsaturated compound with a peroxygen such as peracetic acid or by reaction of an epichlorhydrin with a compound having a reactive hydrogen, followed by dehydrohalogenation. Once again, these methods of synthesis are well known to a person skilled in the art and reference may be made to the *Handbook of Epoxy Resins*, Lee and Neville, eds., McGraw Hill, 1967, chapters 1 and 2. The resins commercially available will of course be used in actual practice, especially the epoxy resins derived from epichlorhydrin.

Examples of such resins are the di- and polyglycidyls derived from bisphenols, such as bisphenol A, bisphenol F and bisphenol S; the dihydroxynaphthalenes, for example 1,4-, 1,6-, 1,7-, 2,5-, 2,6-, and 2,7-dihydroxynaphthalenes; 9,9-bis[hydroxyphenyl]fluorene; the phenols and cresols substituted by dicyclopentadiene as described in U.S. Pat. No. 3,536,734; the aminophenols, in particular 4-aminophenol; amines such as 4,4'-, 1,4'- and 3,3'-methylene dianiline and the corresponding derivatives in which the methylene group is replaced by a (C1–C4)alkyl possibly substituted, —O—, —S—, —CO—, —O—CO—, —O—CO—O—, —SO$_2$—, or an aryl group; and the polyarylene oligomers having amino and/or terminal hydroxy functions, and having —O—, —S—, —CO—, —O—CO—, —O—CO—O—, —SO$_2$— bridges, and/or lower alkyl groups between the mono- or polynuclear aryl groups as described in U.S. Pat. No. 4,175,175.

Cresol- or phenol-type novolacs are also appropriate epoxy resins for making a pulverulent compound in the meaning of the invention. Novolacs are prepared by condensing phenol or cresol with formaldehyde, and most frequently have more than two hydroxy groups per molecule. The glycidyl derivatives of novolac in the form of a solid may also be used.

As examples of thermoplastic polymers that may be used under the invention, the following may be cited: polyimides, polyether imides (PEI), polyether sulfones (PES), polysulfones, polyether ketones, polyether ether ketones (PEEK), polyamides, polyamide imides and their analogs. The list of elastomers suitable for being used in the present invention includes the vinyl addition polymers and specifically the rubber diene homopolymers or copolymers, derived from the conjugation of 4–8 carbon atom dienes such as butadiene, isoprene, propylene or chloroprene. The list given is in no way limiting and includes the copolymers of such dienes with one or more monomers of the following types: styrene, acrylonitrile, methacrylonitril, acrylic acid, methacrylic acid, or methyl methacrylate. The butadiene-acrylonitrile polymers and butadiene-acrylonitrile polymers functionalized with a carboxyl group are particularly preferred. Fluoroelastomers and polysiloxane elastomers adapted to the present invention are also described respectively in Polym. Int., 26(2), 69–73, 1991 and in J Appl. Polym. Sci., 54(1), 83–90, 1994.

The inorganic phosphorus compound(s) used in the above-mentioned compound are selected because they are not soluble in the resin matrix used later at the time of fabricating the composite material. It is important that the compound(s) not be halogenated. As examples, the ammonium polyphosphates or red phosphorus are suitable. Red phosphorus is particularly preferred.

The treatment proportion for the fibrous support by the inorganic phosphorus compound(s) is in the range of 2%–20% by weight, preferably in the range of 4%–12% by weight and even more preferably in the range of 6%–10% by weight. Preferably the proportion of inorganic phosphorus compound(s) in the fibrous support is such that the proportion of the compound(s) in the matrix of the final composite is 2%–10% by weight.

The term "treatment proportion for the fibrous support" means the ratio of the weight of the inorganic phosphorus compound(s) to the sum of the weight of the fibrous support and said compound(s). The term "proportion of inorganic phosphorus compound(s) in the final matrix" means the ratio of the weight of the inorganic phosphorus compound(s) to the sum of the weight of the matrix or organic resin and said compound(s). The inorganic phosphorus compound(s) is (are) present on at least a part of the surface of the fibrous support, in the form of particles or discrete areas.

The compound applied to the fibrous support may also include a binder, the role of which is to help fix the particles of the inorganic phosphorus compound(s) on or in the fibrous support. The binder is preferably selected from among the bismaleimide resins, cyanate resins, epoxy resins and mixtures thereof. The resins used as the binder are such as those previously defined for the thermosetting prepolymer(s). Preferably, the proportion of fibrous support treated by the binder is in the range of 0%–10% by weight, preferably in the range of 1%–3% by weight. When the binder is present on at least a part of the surface of the fibrous support, the binder is in the form of a film or in the form of particles or discrete areas.

The compound may also contain up to 10% by weight of one or more additives. The additives may be chosen from, but are not limited to, thermally conductive particles, electrically conductive particles, dyes, catalysts, curing agents, coupling agents.

According to a second embodiment, the invention concerns a process for fabricating a fibrous reinforcement comprising a fibrous support, including the following stages:

a) Prepare a mixture containing

About 20%–60% by weight of one or more thermosetting prepolymers with a softening temperature of 150° C. or less, preferably in the range of 50°–100° C., and/or one or more thermoplastic polymers with a glass transition temperature under 300° C., preferably in the range of 50–200° C., and About 80%–40% by weight of one or more inorganic phosphorus compounds, and b) Treat throughout or at least partially cover the fibrous support with the mixture thus obtained.

According to one embodiment of the process of the invention, the resin component (thermosetting prepolymer(s), thermoplastic polymer(s) or a mixture thereof ("polymer")), and the inorganic phosphorus compound(s) ("compound") are in the form of a powder. In this case, it is preferable to use the constituents in a weighted polymer: compound ratio in the range of 60:40–20:80, preferably in the range of 60:40–40:60. It is also preferable to mix the constituents in an inert atmosphere.

The pulverulent mixture may be deposited following any traditional technique, for example by dipping the fibrous support in a vat of powder then subjecting it to vibrations upon removing it, or else by using a powder spray gun or again according to other traditional techniques using applicator cylinders. The organic constituent(s) of the powder is (are) then partially or completely melted using any appropriate technique such as infrared heating, to be retained on the fibrous support.

According to another embodiment of the process of the invention, first the thermosetting prepolymer(s), the thermoplastic polymer(s) or a mixture thereof, is mixed in a water emulsion or dispersion, with the inorganic phosphorus compound(s) in a water dispersion, in a weighted ratio of active material (still called dry material) to provide a polymer/compound ratio in the range of 60:40–20:80, preferably in the range of 35:65–20:80.

Next, the fibrous support is immersed in the mixture obtained; then, after being squeezed out to control and regulate the liquid it carries, the fibrous support is dried by any appropriate technique, such as blowing on it with warm air. It would also be possible to deposit the liquid mixture by other methods such as projection, roller kiss coating or, including but not limited to, a technique called enduction, with a doctor blade or with a rotating cylinder.

Especially preferably, the dried fibrous support may then be treated using a traditional powdering technique with a binder such as previously defined, in the form of a powder (which will be melted to adhere to the fibrous support), applied to at least one of the surfaces of the treated and dried fibrous support. In particular it is possible to refer to the powdering techniques described in patent applications WO 90/04507 and WO 98/50211. The binder thus deposited will have the role of allowing preforms to be made from stacks of several fibrous supports.

The fibrous reinforcement according to the invention may be assembled and shaped when dry, prior to being inserted in a mold, with semi-rigid preforms to provide a material that is easily handled, can be cut rapidly, for example in the form of a stack and is well adapted to automatic processes.

Thus, according to a third embodiment, the invention concerns a stack of fibrous reinforcements as defined above. The stacks of different fibrous reinforcements according to the invention are made by assembly, using well-known techniques, at temperatures generally lower than 100° C. and under reduced pressure, specifically 50–100 kPa. Of course, the fibrous reinforcement and the stacks according to the invention may be preformed at a temperature lower than 100° C. and under reduced pressure, specifically 50–100 kPa, depending on the desired form of the composite item to be fabricated. These conditions, naturally, depend upon the different constituents of the compound applied to the fibrous support. In particular, higher temperatures may be used if the thermosetting prepolymer(s) is (are) combined with a hardener and if it is desired to obtain reticulation or else if the compound contains at least one thermoplastic polymer that it is desired to melt. In addition, these different products are well adapted to making composite items, in particular molded composite items. Such composite items, which make a fourth embodiment of the invention, are obtained by associating a fibrous reinforcement or a stack according to the invention with a resin matrix that is compatible with the compound made of (a) thermosetting prepolymer(s) and/or thermoplastic polymer(s) and of (an) inorganic phosphorus compound(s).

Preferably the nature of the resin matrix will be identical to that of the resin used in the compound. To obtain the composite items, a direct process may be used, such as the RTM, RFI or LRI processes.

One particularity of the invention is that, in spite of the initial objective of proposing a fibrous reinforcement to be used in direct processes, it is also possible to obtain composite items by an indirect process in which the fibrous reinforcement or stack of fibrous reinforcements according to the invention is impregnated using techniques well known to a person skilled in the art, with a view to the prepreg fabrication.

The composite items according to the invention preferably have a proportion of fibers by volume in the range of 50%–60%. In addition, when composite items are designed, the solution proposed by the invention allows resin to flow into the fibrous reinforcement. Also, the mechanical properties of the composite items fabricated are especially satisfactory and the composite items fabricated have excellent fire resistance properties.

Thus in a fifth embodiment, the invention concerns the use of a fibrous reinforcement or a stack of fibrous reinforcements according to the invention, as a fire-retarding agent for fabricating composite items.

The examples hereinafter illustrate the invention, without limiting it.

EXAMPLE NO. 1

Preparation of a Fibrous Reinforcement Based on Epoxy Resin and Red Phosphorus

A 50% dry extract water dispersion of red phosphorus and a 45% proportion of phosphorus (ref. Exolit® RP 622, marketed by Clariant) is mixed at ambient temperature with a 55% dry extract water emulsion of epoxy resin (ref. Prox E032-38E, marketed by Synthron). A thickening agent (ref. Texipol® 5028, marketed by Scott-Bader) is also added to limit the sedimentation velocity. Deionized water is also used to regulate the active material content of the compound as a whole:

| | |
|---|---|
| Exolit ® RP 622 | 20.10 |
| Prox E032-38 | 4.27 |
| Texipol ® 5028 | 1.20 |
| Water | 74.43 |

Next, a carbon fabric made of 370-g/m$^2$ satin 5 weave (ref. G0926, marketed by Hexcel Fabrics), is immersed in the mixture obtained above so as to obtain a fabric treatment ratio on the order of 6%–7% by weight.

The impregnated and dried fabric is then powdered on both surfaces with an epoxy resin (ref. HP03, marketed by Hexcel Fabrics), with an average granulometry of about 35 μm, according to the standard powdering technique, also with standard melting temperature and velocity parameters, so as to obtain a powder treatment ratio of 5%±0.5%.

EXAMPLE NO. 2

Preparation of a Fibrous Reinforcement Based on Epoxy Resin and Red Phosphorus

An epoxy resin powder (ref. HP03, marketed by Hexcel Fabrics), with an average granulometry of about 35 μm is mixed at ambient temperature and in an inert atmosphere using a Forberg F60 powder mixer, in a 1:1 proportion, with a red phosphorus powder (ref. Exolit® RP 605, marketed by Clariant). A carbon fabric made of 370-g/m$^2$ satin 5 weave (ref. G0926, marketed by Hexcel Fabrics) is powdered on both surfaces with the powder mixture obtained above, according to the standard production technique, also with standard temperature and velocity parameters, so as to obtain a fabric treatment ratio on the order of 10%–12% by weight.

EXAMPLE NO. 3 (COMPARATIVE)

Preparation of a Non-Fire-Proof Fibrous Reinforcement, Based on Epoxy Resin

A carbon fabric made of 370-g/m$^2$ satin 5 weave (ref. G0926, marketed by Hexcel Fabrics) is powdered on both surfaces with an epoxy resin (ref. HP03, marketed by Hexcel Fabrics), with an average granulometry of about 35 μm, according to the standard powdering technique, also with standard melting temperature and velocity parameters, so as to obtain a powder treatment ratio of 5%±0.5%.

EXAMPLE NO. 4

Preparation of Composites and Evaluation of Their Properties

Composite sheets are made by injecting structural epoxy resin (ref. RTM6, marketed by Hexcel Composites) in a stack of fibrous reinforcements according to examples 1–3, first preformed at 100° C. under reduced pressure (2 mbar of residual vacuum).

The composite items obtained are 2.2 mm thick and have a fiber ratio of 57% by volume, which, for examples 1 and 2, corresponds to a red phosphorus ratio on the order of 8%±2% by weight in the final organic matrix.

The composite items have been subjected to a fire resistance test according to the FAR 25-853-a (60 s test) and FAR 25-853-b (12 s test) testing methods in force for aeronautical applications and well known to a person skilled in the art.

The composite items have also been subjected to an interlaminar shear strength (ILSS) test, well known to a person skilled in the art and described in the NF EN ISO 14130, ASTM D2344 or NF EN 2563 standards. This property is measured at 120° C., after immersing the test samples in boiling water for 72 h.

The results are shown in the following table:

|         | Fire Resistance | | ILSS |
|---------|---|---|---|---|
|         | Duration of ignition (s) | | Length destroyed (mm) | | (mPa) |
| Example | 1 | 2 | 1 | 2 | 3 |
| 1 | 0 | 0 | 47 | 10 | 34 |
| 2 | 0 | 0.5 | 57.5 | 15 | 35 |
| 3 (comparative) | 22 | 54 | 105 | 55 | 34 |

1 FAR 25-853-a
2 FAR 25-853-b
3 Tested at 120° C. after 72 h immersion in boiling water These results show that the fibrous reinforcements of the invention allow the preparation of composite items having excellent fire-resistance properties, without weakening their mechanical properties.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A fibrous reinforcement for use in making composite items that comprises:
   a) a fibrous support having a surface, said fibrous support comprising reinforcing fibers selected from the group consisting of fiberglass, carbon and ceramic; and
   b) a compound comprising:
      i) a resin component comprising a resin selected from the group consisting of thermosetting prepolymers having a softening temperature of 150° C. or lower and thermoplastic polymers with a glass transition temperature lower than 300° C.; and
      ii) an inorganic phosphorus compound wherein the treatment ratio for the fibrous support with said inorganic phosphorus compound falls within the range of 2%–20% by weight.

2. A fibrous reinforcement according to claim 1 wherein said compound is located throughout said fibrous support.

3. A fibrous reinforcement according to claim 1 wherein said compound is located on the surface of said fibrous support.

4. A fibrous reinforcement according to claim 1 wherein said compound comprises about 20%–60% by weight of said resin component and about 80%–40% by weight of inorganic phosphorus compound.

5. A fibrous reinforcement according to claim 1 wherein said thermosetting polymer has a softening temperature of between 50 and 100° C.

6. A fibrous reinforcement according to claim 1 wherein said thermoplastic polymer has a glass transition temperature of between 50 and 200° C.

7. A fibrous reinforcement according to claim 1 wherein said inorganic phosphorous is red phosphorous.

8. A fibrous reinforcement according to claim 1 wherein said thermosetting prepolymer is selected from the group consisting of bismaleimide resins, cyanate resins, epoxy resins and mixtures thereof.

9. A fibrous reinforcement according to claim 1 wherein said thermoplastic polymer is selected from the group consisting of polyimides, polyether imides, polyether sulfones, polysulfones, polyether ketones, polyether ether ketones, polyamides and polyamide imides.

10. A process for fabricating a fibrous reinforcement comprising a fibrous support, said process comprising the steps of:
   a) providing a mixture comprising:
      i) about 20%–60% by weight of a resin component comprising a resin selected from the group consisting of thermosetting prepolymers having a softening temperature of 150° C. or lower and thermoplastic polymer having a glass transition temperature lower than 300° C.; and
      ii) about 80%–40% by weight of an inorganic phosphorus compounds;
   b) providing a fibrous support having a surface; said fibrous support comprising a reinforcing fiber selected from the group consisting of fiberglass, carbon and ceramic; and
   c) treating said fibrous support with said mixture to provide a treated support wherein the treatment ratio for the fibrous support with said inorganic phosphorus compound falls within the range of 2%-20% by weight.

11. A process according to claim 10 wherein step a) comprises providing said mixture in pulverulent form and wherein step c) comprises applying said pulverulent form of said mixture to said fibrous support to form a powdered support and wherein said process includes the additional step of thermally fusing said mixture in said pulverulent form with said fibrous support.

12. A process according to claim 10 wherein said thermosetting polymer has a softening temperature of between 50 and 100° C.

13. A process according to claim 10 wherein said thermoplastic polymer has a glass transition temperature of between 50 and 200° C.

14. A process according to claim 10 wherein said inorganic phosphorous is red phosphorous.

15. A process according to claim 10 wherein step a) comprises providing a mixture wherein said resin is dispersed in water and said inorganic phosphorus compound is dispersed in water to provide a water dispersion of said mixture and wherein step c) comprises immersing said fibrous support in said water dispersion of said mixture.

16. A process according to one of claim 10 wherein said thermosetting prepolymer is selected from the group consisting of bismaleimide resins, cyanate resins, epoxy resins and mixtures thereof.

17. A process according to claim 10 wherein said thermoplastic polymer is selected from the group consisting of polyimides, polyether imides, polyether sulfones, polysulfones, polyether ketones, polyether ether ketones, polyamides and polyamide imides.

* * * * *